Patented Feb. 28, 1939

2,149,039

UNITED STATES PATENT OFFICE 2,149,039

PURIFICATION OF HALOGENATED HYDROCARBONS

Anthony F. Benning, Penns Grove, Robert C. McHarness, Carneys Point, and Rufus G. Hartig, Salem, N. J., assignors to E. I. du Pont de Nemours & Company, Wilmington, Del., a corporation of Delaware No Drawing. Application June 11, 1936, Serial No. 84,770

6 Claims. (Cl. 260—653)

This invention relates to the purification of gases from carbonyl sulfide, and more particularly to the removal of carbonyl sulfide from halogenated aliphatic hydrocarbons containing chemically combined fluorine.

In the production of fluorochloromethanes the carbon disulfide present in the carbon tetrachloride used as a starting material is partly converted to carbonyl sulfide. Because of its very low concentration this carbonyl sulfide is difficult to remove by ordinary methods. Its presence in the final product is objectionable because of the odor of one of its decomposition products, hydrogen sulfide, which is slowly formed under storage conditions.

It is an object of the invention to provide a new and improved method for the decomposition of carbonyl sulfide. A further object is to provide a new and improved process for purifying gases containing carbonyl sulfide. A more specific object is to provide a new and improved process for the removal of carbonyl sulfide from halogenated aliphatic hydrocarbons containing chemically combined fluorine. Other objects will appear hereinafter.

These objects are accomplished in accordance with the present invention by the catalytic hydrolysis of carbonyl sulfide or gases containing carbonyl sulfide, in the presence of water and alumina as the catalyst. We preferably use as the catalyst a dehydrated aluminum hydroxide such as is technically available for use as a drying agent known as activated alumina.

The invention will be further illustrated by the following examples.

Example I

Dichlorodifluoromethane containing approximately 2 P. P. M. (parts per million) of carbonyl sulfide was passed through water at room temperature to humidify the gas. The resulting gas was then passed over alumina, held at 100° C., at a rate of approximately 80 cu. ft. of gas per pound of catalyst per hour. The issuing gas was then tested for H₂S which was found to be present.

This method is also effective when the concentration of carbonyl sulfide is relatively high. Pure carbonyl sulfide when passed over alumina under the conditions given in this example is apparently completely decomposed. In admixture with dichlorodifluoromethane at 0.5% concentration the catalyst is also effective.

The following example illustrates the effectiveness and stability of the catalyst.

Example II

Dichlorodifluoromethane containing 0.5% carbonyl sulfide was passed through water at about 35° C., preheated to 100° C. and passed over alumina also at 100° C. at a rate giving a contact time of 2.6 seconds. The resulting gas was passed through 10% caustic solution to remove the H₂S and CO₂. This scrubbed gas was then tested for carbonyl sulfide and found to contain less than 1 P. P. M. This experiment was continued until a total of over 200 pounds of the above described gas mixture had been passed per pound of alumina.

Example III

The crude reaction product obtained in the manufacture of dichlorodifluoromethane from CCl₄ which had been freed of acid by passage through water and aqueous caustic and which contained among other products dichlorodifluoromethane, trichloromonofluoromethane, carbon tetrachloride, moisture and carbonyl sulfide, was passed through a bed of alumina held at 100° C. The issuing gas was then washed with 10% NaOH solution and tested. No detectable amount of carbonyl sulfide remained.

The invention is not limited by the foregoing examples. Thus, we have found that the process is effective with a large number of other gases, including the following: air, hydrogen-nitrogen mixtures, carbon tetrachloride vapor, trichlorofluoromethane, tetrafluorodichloro-ethane, dichloromonofluoromethane, mixtures of carbon monoxide, carbon dioxide and hydrogen, mixtures of carbon monoxide and hydrogen, ammonia, ammonia-air mixtures, technical carburetted water gases, producer gas, butane-air mixtures, e. g., containing 20 parts by volume of butane to 80 parts of air.

In practicing the invention, we prefer to effect the catalytic hydrolysis at temperatures within the range of 20°–150° C., but higher or lower temperatures may be used. In general, especially desirable results have been obtained at temperatures within the range of 75°–125° C. as the reaction appears to be more complete in this range. The reaction has been effected with good results at atmospheric pressure but superatmospheric pressures may also be used.

A suitable catalyst may be prepared as follows:

Dissolve 350 parts by weight of Al₂(SO₄)₃.18H₂O in 2000 parts of water and precipitate the aluminum hydroxide by the addition of a slight excess of ammonium hydroxide solution. Filter the precipitate on a suction filter, slurry with 2000 parts of water and refilter. After four similar washings dry the filter cake at 175° C. for forty-eight hours, cool the resultant product and break it into suitable sized fragments. The gel thus obtained is satisfactory for use. Still more active material can be obtained by further heating of the gel at 300° C. for several hours.

It will be recognized that the form of the alumina and its state of hydration are subject to variation. Although we find that practically dehydrated alumina containing adsorbed moisture is very effective, less strongly dehydrated material may be used.

The manner in which the gases to be purified or hydrolyzed are contacted with the catalyst can vary considerably depending upon the specific problem. For example, the gases may be passed through or over a bed of alumina or may be passed through open trays containing the alumina or may be compressed into a vessel which contains the catalyst. Likewise, the method of introducing water, if not already present, may be accomplished by a number of methods. The moisture may be sprayed into the gas, introduced as steam or added by passing the gas over or through water or water solutions.

The decomposition products of the carbonyl sulfide which apparently consist essentially of carbon dioxide and hydrogen sulfide in accordance with the equation:

$$COS + H_2O \rightarrow CO_2 + H_2S$$

may be removed from the gases by well known methods for the removal of carbon dioxide and hydrogen sulfide, for example, by absorption in water and/or caustic alkali solutions under atmospheric or superatmospheric pressure.

The invention is preferably applied in the treatment of gases containing halogenated hydrocarbons, such as mixtures of gaseous halogenated hydrocarbons containing chemically combined fluorine. If the gas to be treated contains more acid than the alumina catalyst will tolerate, it should preferably be subjected to a preliminary treatment for removal of the acid, for instance, by treatment with an alkaline neutralizing agent. For this purpose, ammonia or amines may be used, e. g., as described in Dunphy, U. S. Patent 1,946,-199 and Daudt, U. S. Patent 1,946,195. We have found that weak acids such as carbonic acid and acetic acid do not materially affect the catalyst. Stronger acids such as sulfurous and hydrochloric affect the catalyst if sufficient amounts are present, but we find that with as much as 10% sulfur dioxide in the gas the hydrolysis can still be effected. The same is true with respect to hydrogen chloride. It is preferable, however, that the gases be alkaline, neutral or only slightly acid (i. e., containing less than 5 to 10% of mineral acid).

The removal of carbonyl sulfide from gases has been the subject of much investigation and has been a particularly troublesome problem. Carbonyl sulfide is a relatively stable compound. It is soluble in water to the extent of about 0.8 volume per volume of water and can be recovered from the water solution. It is not readily hydrolyzed by caustic alkali, and hence, this reagent is not satisfactory for the decomposition of the gas. It is readily hydrolyzed by alcoholic caustic but this reagent has the disadvantage of introducing a volatile solvent into the products. If large quantities of gases should be treated for the removal of relatively small amounts of carbonyl sulfide, the loss of alcohol becomes prohibitive. In general, previously known methods for the removal of carbonyl sulfide from gases depend either on the oxidation, hydrogenation or direct absorption of the carbonyl sulfide. In many cases these methods are undesirable. For instance, the addition of oxygen or air to the gas is often undesirable. Hydrogenation of carbonyl sulfide is likewise unsatisfactory because complete removal requires the presence of considerable hydrogen.

In the manufacture of halogenated aliphatic hydrocarbons containing chemically combined flourine, methods of the type above described involving the introduction of either air or hydrogen are undesirable because they interfere with the proper condensation of the product. The present invention is especially advantageous in the purification of such gases not only because of its effectiveness in removing minute quantities of carbonyl sulfide, but also because no other gas except water vapor is required to effect the removal of the carbonyl sulfide.

As many apparently widely different embodiments of this invention may be made without departing from the spirit and scope thereof, it is to be understood that we do not limit ourselves to the specific embodiments thereof except as defined in the appended claims.

We claim:

1. The process which comprises passing halogenated aliphatic hydrocarbons containing chemically combined fluorine and carbonyl sulfide together with water vapor into contact with alumina catalyst at a temperature not exceeding 150° C.

2. The process of purifying halogenated hydrocarbons containing chemically combined fluorine and carbonyl sulfide which comprises bringing said materials into contact with activated alumina in the presence of moisture at a temperature not exceeding 150° C., and subsequently removing the reaction products.

3. The process of purifying halogenated hydrocarbons containing chemically combined fluorine and carbonyl sulfide which comprises passing said materials over activated alumina in the presence of water at a temperature within the range of 20° C. to about 150° C.

4. The process of purifying halogenated hydrocarbons containing chemically combined fluorine and carbonyl sulfide which comprises passing said materials over activated alumina in the presence of water at a temperature within the range of 75° C. to 125° C.

5. The process which comprises contacting dichloro-difluoromethane containing small amounts of carbonyl sulfide with an activated alumina catalyst in the presence of moisture and at a temperature within the range of 75° C. to 125° C.

6. The process which comprises contacting trichloro-fluoro methane containing small amounts of carbonyl sulfide with an activated alumina catalyst in the presence of moisture and at a temperature within the range of 75° C. to 125° C.

ANTHONY F. BENNING.
ROBERT C. McHARNESS.
RUFUS G. HARTIG.